United States Patent
Fontenot et al.

(10) Patent No.: US 12,457,263 B2
(45) Date of Patent: Oct. 28, 2025

(54) ZERO TOUCH POLICY PROVISIONING IN WORKLOAD PROTECTION SOLUTIONS

(71) Applicant: Cisco Technology, Inc., San Jose, CA (US)

(72) Inventors: Gabriel J. Fontenot, Richardson, TX (US); Paul Mach, San Jose, CA (US); Janardhanan Radhakrishnan, San Jose, CA (US); Jorge Quintero, Cracow (PL); Troy Michael Traina, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 18/523,514

(22) Filed: Nov. 29, 2023

(65) Prior Publication Data
US 2025/0175520 A1    May 29, 2025

(51) Int. Cl.
*G06F 15/173*  (2006.01)
*H04L 67/1008*  (2022.01)

(52) U.S. Cl.
CPC .............................. *H04L 67/1008* (2013.01)

(58) Field of Classification Search
None
See application file for complete search history.

(56) References Cited

U.S. PATENT DOCUMENTS

| | | |
|---|---|---|
| 9,300,691 B1 | 3/2016 | Banerjee |
| 11,636,213 B1 | 4/2023 | Elgressy et al. |
| 2019/0089742 A1 | 3/2019 | Hill |
| 2022/0006842 A1* | 1/2022 | Wadhwa ................. H04L 63/20 |
| 2022/0123996 A1 | 4/2022 | Fainberg et al. |
| 2022/0210194 A1* | 6/2022 | Parekh ................... H04L 67/10 |

* cited by examiner

*Primary Examiner* — Wing F Chan
*Assistant Examiner* — Andrew Woo
(74) *Attorney, Agent, or Firm* — Rutan & Tucker, LLP; Ravi Mohan; Marc McClain

(57) ABSTRACT

Devices, systems, methods, and processes for automatically generating, at least in part, a segmentation strategy. Users of workload protection solutions can initiate a process to deploy various agents onto a network with one or more operating systems. The initial scope may be defined via one or more best practices to generate a scope tree. Associated labels may be defined based on the scope design and any subnets learned from the installed agent interface subnets. Common services can also be defined based on well known ports and/or protocols. Agent-based host names can also be evaluated to define potential application groupings. A generated application dependency mapping can be applied to understand potential application boundaries and potential policy recommendations. These steps can help a user to begin their segmentation strategy when deploying a workload protection solution.

19 Claims, 12 Drawing Sheets

ZERO TOUCH POLICY PROVISIONING IN WORKLOAD PROTECTION SOLUTIONS

The present disclosure relates to networking. More particularly, the present disclosure relates to automatically identifying and classifying network traffic to generate a recommended policy.

BACKGROUND

Software applications have become critically important for organizations worldwide, serving as the lifeblood of their operations. Applications not only drive revenue but also engage customers, facilitate business outcomes, and differentiate organizations from their competitors. Developers, as the creators of these applications, play a central role in business transformation and are valued customers of enterprise IT. IT operators, including networking professionals, provide business value by supporting applications with agility and efficiency.

Developers are deploying applications in multiple public and private clouds, often alongside legacy applications in various data centers. The rise of microservices is also contributing to the development of highly distributed application environments, with application tiers and data services spread across data centers and public clouds. However, outdated protocols and tools have failed to keep up with these dynamic application environments, leading to challenges in monitoring and ensuring application availability and performance.

Addressing these challenges can lead to better network performance and reliability. In response, workload protection solutions offer machine learning capabilities that provide actionable insights into network performance. They can enhance network visibility, supports mission-critical applications in both on-premises data centers and the public cloud, and offers comprehensive traffic telemetry information. The platform performs advanced analytics and tracks network topology, making it easier for operations teams to manage and optimize network performance for digital business and cloud infrastructures. Such a holistic approach to protect data centers and workloads across multiple cloud environments can be achieved, in part, by implementing segmentation, zero-trust models, and automated compliance enforcement.

However, many users of workload protection solutions are not aware of where to begin their segmentation strategy. It can be cumbersome for a new user of such a system to understand and implement various scopes, labels, hierarchies, and network policies on their own without significant training. This can lead to a network having an increased amount of time being open to vulnerabilities.

SUMMARY OF THE DISCLOSURE

Systems and methods for automatically identifying and classifying network traffic to generate a recommended policy in accordance with embodiments of the disclosure are described herein. In some embodiments, a device includes a processor, at least one network interface controller configured to provide access to a network, and a memory communicatively coupled to the processor, wherein the memory includes a workload protection logic. The logic is configured to establish a workload protection solution onto a network including a plurality of network devices, deploy a plurality of agents onto one or more network devices, receive telemetry data, and generate at least one policy recommendation based on the received telemetry data.

In some embodiments, the telemetry data includes at least scope data.

In some embodiments, the scope data is defined based on one or more best practices.

In some embodiments, the scope data defines one or more scope memberships.

In some embodiments the telemetry data includes at least label data.

In some embodiments, the label data includes a list of labels.

In some embodiments, at least one of the list of labels is based on a subnet boundary.

In some embodiments, the workload protection logic is further configured evaluate the plurality of agents and wherein the received telemetry data includes at least agent data. In some embodiments, the telemetry data includes at least common services data.

In some embodiments, the workload protection logic is further configured to determine one or more known ports or protocols.

In some embodiments, the common services data is based on at least the one or more known ports or protocols.

In some embodiments, the plurality of agents are associated with a workload including a workload host name.

In some embodiments, the telemetry data includes at least one or more workload host names.

In some embodiments, the at least one policy recommendation is an application dependency mapping.

In some embodiments, the workload protection logic is further configured to apply an application dependency mapping to the network associated with the workload protection solution.

In some embodiments, a device includes a processor, at least one network interface controller configured to provide access to a network, and a memory communicatively coupled to the processor, wherein the memory includes a workload protection logic. The logic is configured to establish a workload protection solution onto a network including a plurality of network devices, deploy a plurality of agents onto one or more network devices, gather telemetry data, define a plurality of workload configurations, generate at least one application dependency mapping, and apply the at least one application dependency mapping to the network.

In some embodiments, the configurations include at least one or more scopes.

In some embodiments, the configurations include at least one or more labels.

In some embodiments, the configurations include at least one or more common services.

In some embodiments, a method generates an application dependency mapping, including establishing a workload protection solution onto a network including a plurality of network devices, deploying a plurality of agents onto one or more network devices, gathering telemetry data, defining a plurality of workload configurations, and generating at least one application dependency mapping.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
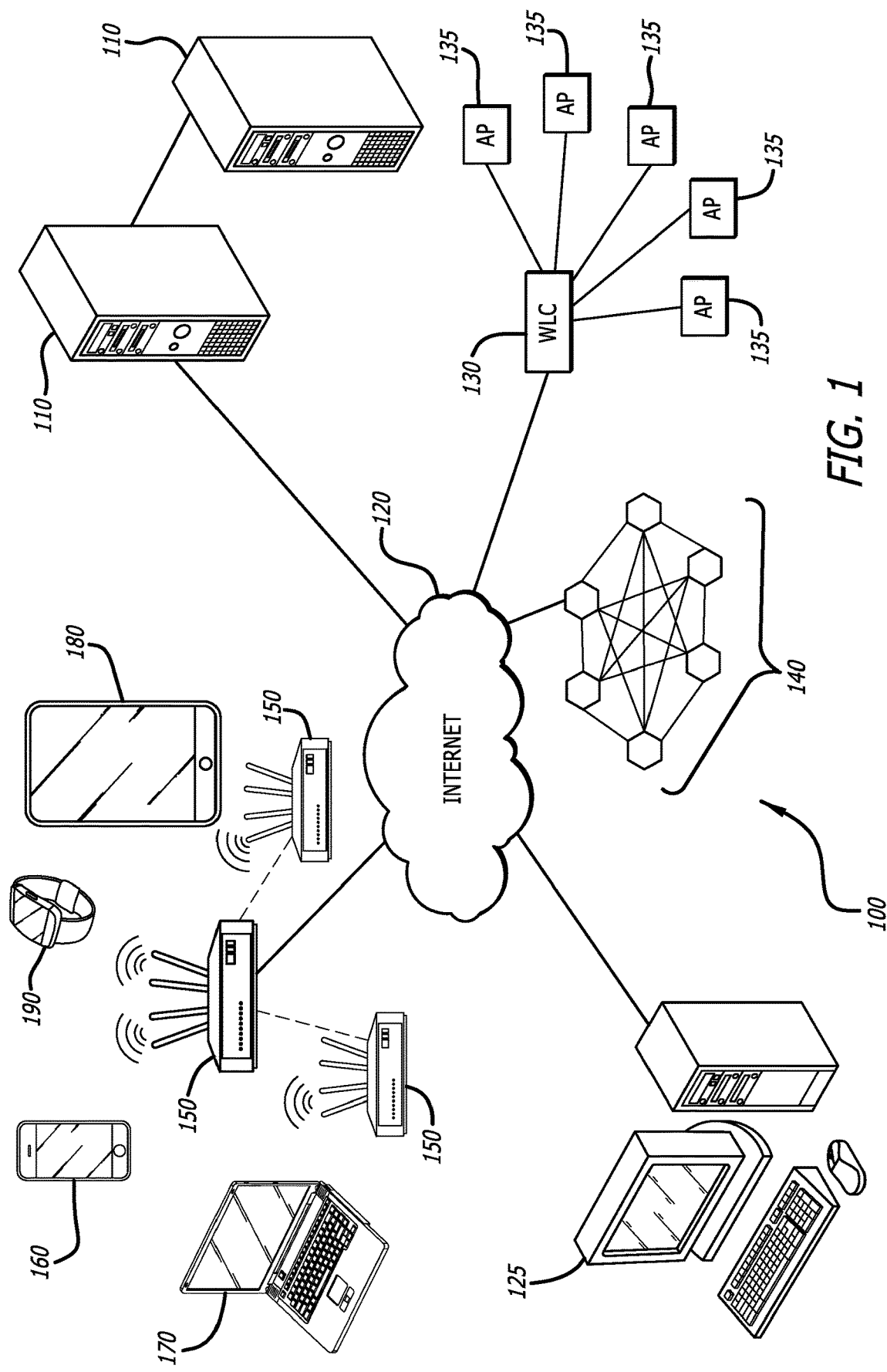
FIG. 1 is a conceptual network diagram of various environments that a workload protection logic may operate within in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can assist with collecting telemetry through deployed agents, identify traffic, and define scopes, labels, and other attributes to generate and apply an application dependence map, policy recommendations, or other configurations onto a network. Often, users, such as network administrators, are not always aware of where to start their segmentation strategy. As a result, a "zero-touch" approach can be configured to allow users to focus on deploying agents (to collect the required telemetry) and have the workload protection solution do a portion of the work to identify and classify traffic and recommend discovered policy.

This approach can occur in a variety of ways. In some embodiments, agents can be deployed onto various operating systems (Windows, Linux, etc.), which can collect various telemetry data and communicate such data to a workload protection logic. In more embodiments, an initial scope tree can be generated based on best practices. This can allow for labels to be associated with various aspects of the scope tree or other data (i.e., subnet data) that is gathered by the agents. In additional embodiments, the well-known ports or protocols can be utilized to define common services. In some embodiments, agent-based workload host names are evaluated to define potential application groupings. Upon processing various data as those previously described, various embodiments can generate and/or execute an application dependency map to understand the potential boundaries of applications and recommend one or more policies.

Workload Protection Solutions

In many embodiments, a workload protection solution offers a holistic approach to protect data centers across multiple cloud environments by implementing a zero-trust model through segmentation. This approach helps in faster detection of security incidents, containment of lateral movement, and reduction of the attack surface. Workload protection solutions are often infrastructure-agnostic and support on-premises as well as public cloud workloads. These solutions can provide capabilities like automated "allow list" policy generation based on real-time telemetry data, enforcing a zero-trust model, identifying process behavior deviations, and detecting software vulnerabilities. These workload protection solutions can be deployed in numerous way including, but not limited to, appliance-based, virtual, and Software as a Service ("SaaS") deployment solutions.

Workloads

In the context of various network infrastructures, a "workload" typically refers to a unit of work or a specific set of tasks that a computing system, server, or other network device is responsible for executing. In some environments, the term "workload" may be hosts that have a Secure Workload Agent ("SWA") installed while hosts that do not have a SWA installed on them can be considered "IP addresses".

Workloads can vary widely and encompass various types of applications and services, including application workloads like web applications and databases, virtualization workloads represented by virtual machines or containers in virtualized environments, data workloads related to data processing and storage tasks, network workloads associated with network services and data transmission, security workloads for services like firewalls and encryption, and storage workloads concerning data storage and management. Workload protection solutions can secure these various workloads in data centers, cloud environments, and network infrastructures. Understanding and efficiently securing various workloads is often considered essential for optimizing resource utilization and ensuring the performance, and reliability of IT systems.

Segmentation

In networking, "segmentation" often refers to the strategic practice of dividing a network into smaller, isolated segments or subnetworks. Workload protection solutions can utilize segmentation to achieve several critical objectives. Firstly, it bolsters network security by isolating different segments from one another, safeguarding against the potential fallout of a security breach in one segment from affecting the entire network. These segmentation solutions can enforce security policies and regulate traffic flow between segments to prevent unauthorized access and data breaches.

Secondly, segmentation can often simplify network management. By breaking down a large network into more manageable parts, administrators can apply specific policies, monitor network traffic, and troubleshoot issues more effectively within each isolated segment. Additionally, network performance can benefit from segmentation as it reduces congestion and contention for network resources, ultimately enhancing the performance of critical applications and services. Workload protection solutions can be configured to implement network segmentation and micro-segmentation. These tools empower organizations to create, manage, and maintain network segments efficiently, contributing to a more secure, manageable, and streamlined network infrastructure.

Zero-Trust

Also, in the realm of networking, "zero-trust" typically represents a security paradigm that fundamentally challenges the traditional notion of trust within network environments. This model can operate on the premise that no entity, whether situated inside or outside the network, should be automatically trusted. Instead, it mandates stringent access controls and continuous validation procedures. Entities, including users, devices, and applications, are required to authenticate their identity and demonstrate their security posture before being granted access to network resources. This approach aims to fortify network security by eliminating assumptions of trust and significantly reducing the risk of unauthorized access or breaches.

Zero trust principles encompass several key tenets. Firstly, identity verification is a prerequisite for access, necessitating robust authentication methods like multi-factor authentication ("MFA"). Secondly, access rights are strictly governed by the principle of least privilege, limiting permissions to the bare minimum essential for entities to perform their designated functions. Micro-segmentation can be employed to isolate and secure network segments, ensuring rigorous controls on traffic flow and minimizing the potential attack surface. Continuous monitoring of network traffic and entity behavior is paramount to promptly detect and respond to anomalies or security threats.

Lastly, encryption is often widely adopted to safeguard data, whether in transit or at rest. This comprehensive zero trust model can address the evolving threat landscape, acknowledging the presence of potential threats both within and outside the network. It is designed to enhance data and resource security, regardless of their location, in recognition that traditional perimeter-based security approaches are no longer adequate in today's complex and dynamic network environments. Workload protection solutions can be configured to provide solutions to implement a zero-trust security model effectively.

Scopes

Scopes serve as a fundamental component in configuring and establishing policies within a workload protection solution. Scopes can be considered as collections of workloads organized in a hierarchical structure. Workloads can be labeled with attributes that provide insights into their location, role, and/or function in the environment. Often, the purpose of scopes is to offer a framework for dynamic mechanisms, particularly in terms of identification and attributes associated with changing IP addresses.

Scopes may also be primarily utilized for grouping datacenter applications and, when combined with roles, they enable precise control over the management of these applications. For instance, scopes play a pivotal role in defining access to policies, flows, and filters throughout the product. These scopes can be structured hierarchically, forming sets of trees with the root representing, for example, a Virtual Routing and Forwarding (VRF). Each scope tree hierarchy can represent distinct data that does not overlap with others. When defining individual scopes, key attributes can include the parent scope, name (for identification), type (for specifying different categories of inventory), and a query (that can define the individual scope). Often, it may be desired to organize one or more scopes hierarchically to mirror the application ownership hierarchy within the organization.

These scopes are often instrumental in constructing a hierarchical map of your network, which can be referred to as a "scope tree." This hierarchical representation is essential for efficiently establishing and maintaining network policies. For example, utilizing a scope tree can enable the creation of a policy that can be automatically applied to every workload within a specific branch of that tree. Additionally, a scope tree can facilitate the delegation of responsibility for managing certain applications or network segments to individuals with the necessary expertise to define the appropriate policies for those workloads.

Labels

Labels can play a crucial role in defining logical policies within a managed network. By way of non-limiting example, labels can be configured to enable the creation of policies like "allow traffic from "consumer network applications" to "provider database"." Rather than specifying the exact members of the consumer and provider workload groups, these logical policies can be formulated using labels, providing flexibility in dynamically modifying the membership of these groups without altering the policy. Workload protection solutions can receive notifications from configured services, such as external orchestrators and cloud connectors, when workloads are added or removed. This may allow the workload protection solution to continually assess the composition of groups like "consumer network applications" and "provider database" to ensure accurate policy enforcement. Additionally, subnet-based label inheritance is supported, which can allow smaller subnets and IP addresses to inherit labels from larger subnets they belong to. This inheritance can occur when labels are either missing from the smaller subnet/address or when the label value for the smaller subnet/address is empty, enhancing the efficiency and consistency of label management.

Agents

As those skilled in the art will recognize, a software agent or "agent" typically refers to a specialized and autonomous program or script that is designed to perform tasks or make decisions on behalf of a user, system, or organization. These agents can range from simple to highly complex and are often used to automate tasks, gather, and analyze data, and/or interact with other software systems and users. They can act on predefined rules and logic or adapt and learn from their environment. Software agents are used in various applications, including network management, artificial intelligence, data mining, and automation of routine tasks. They can be configured to allow software components to act independently or collaboratively to achieve specific goals.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual network diagram of various environments that a workload protection logic may operate within in accordance with various embodiments of the disclosure is shown. Those skilled in the art will recognize that a workload protection logic can be comprised of various hardware and/or software deployments and can be configured in a variety of ways. In some non-limiting examples, the workload protection logic can be configured as a standalone device, exist as a logic within another network device, be distributed among various network devices operating in tandem, or remotely operated as part of a cloud-based network management tool.

In many embodiments, the network 100 may comprise a plurality of devices that are configured to transmit and receive data for a plurality of clients. In various embodiments, cloud-based centralized management servers 110 are connected to a wide-area network such as, for example, the Internet 120. In further embodiments, cloud-based centralized management servers 110 can be configured with or otherwise operate a workload protection logic. The workload protection logic can be provided as a cloud-based service that can service remote networks, such as, but not limited to the deployed network 140. In these embodiments, the workload protection logic can be a logic that receives data from the deployed network 140 and generates predictions, receives environmental sensor signal data, and perhaps automates certain decisions or protective actions associated with the network devices. In certain embodiments, the workload protection logic can generate historical and/or algorithmic data in various embodiments and transmit that back to one or more network devices within the deployed network 140.

However, in additional embodiments, the workload protection logic may be operated as distributed logic across multiple network devices. In the embodiment depicted in FIG. 1, a plurality of network access points (APs) 150 can operate as a workload protection logic in a distributed manner or may have one specific device facilitate the detection of movement for the various APs. This can be done to provide sufficient needs to the network of APs such that, for example, a minimum bandwidth capacity may be available to various devices. These devices may include but are not limited to mobile computing devices including laptop computers 170, cellular phones 160, portable tablet computers 180 and wearable computing devices 190.

In still further embodiments, the workload protection logic may be integrated within another network device. In the embodiment depicted in FIG. 1, the wireless LAN controller 130 may have an integrated workload protection logic that it can use to generate predictions, and perhaps detect anomalous movements regarding the various APs 135 that it is connected to, either wired or wirelessly. In this way, the APs 135 can be configured such that they can read and report various signal levels and environmental sensor signals to the WLC 130. In still more embodiments, a personal computer 125 may be utilized to access and/or manage various aspects of the workload protection logic, either remotely or within the network itself. In the embodiment depicted in FIG. 1, the personal computer 125 communicates over the Internet 120 and can access the workload protection logic within the cloud based centralized management servers 110, the network APs 150, or the WLC 130 to modify or otherwise monitor the workload protection logic.

Although a specific embodiment for a conceptual network diagram of a various environments that a workload protection logic operating on a plurality of network devices suitable for carrying out the various steps, processes, methods, and operations described herein is discussed with respect to FIG. 1, any of a variety of systems and/or processes may be utilized in accordance with embodiments of the disclosure. For example, the workload protection logic may be implemented across a variety of the systems described herein such that some detections are generated on a first system type (e.g., remotely), while additional detection steps or protection actions are generated or determined in a second system type (e.g., locally). The elements depicted in FIG. 1 may also be interchangeable with other elements of FIGS. 1-2, and 4-12 as required to realize a particularly desired embodiment.

Figure 2:
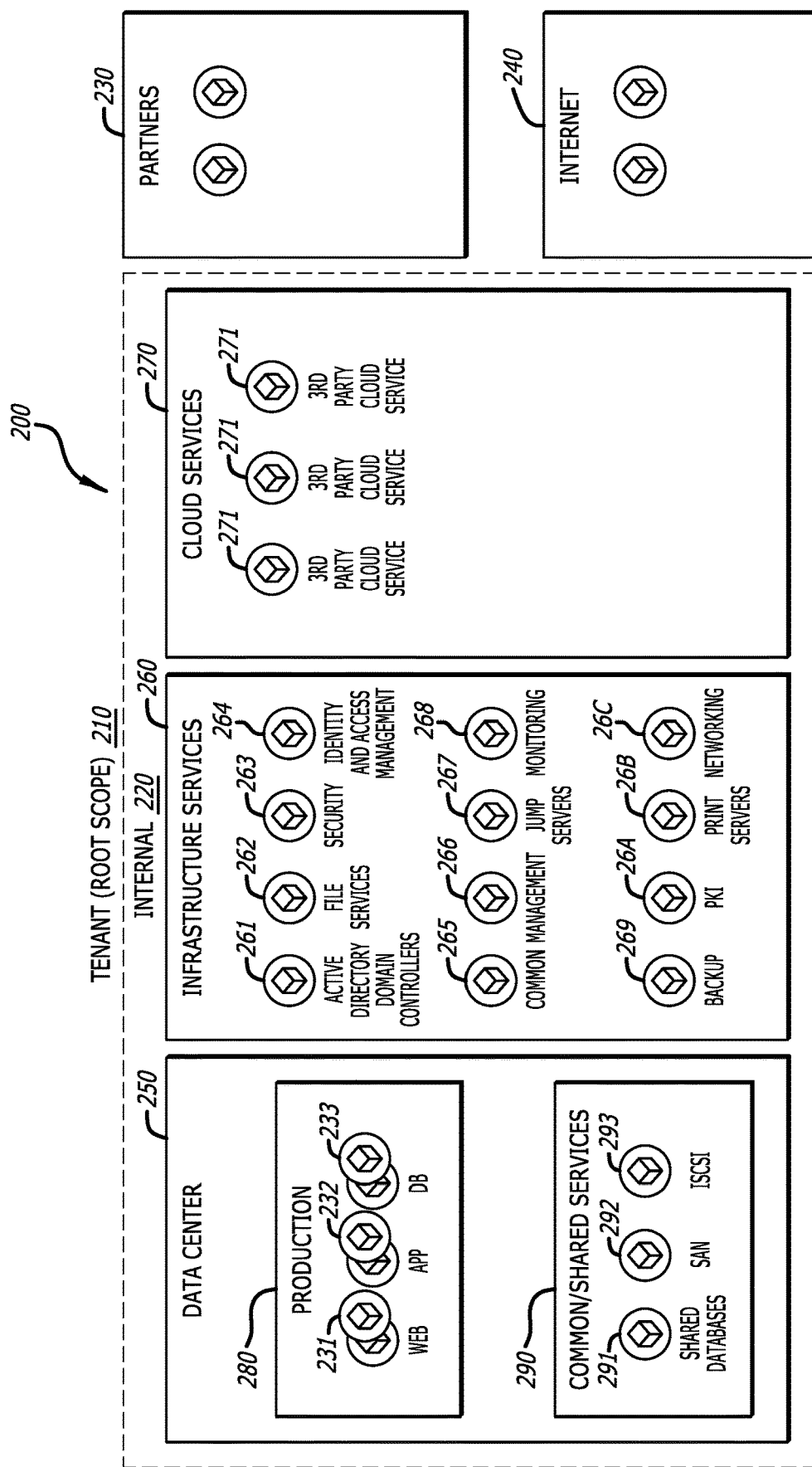
FIG. 2 is a conceptual illustration of a segmentation model within a workload protection system in accordance with various embodiments of the disclosure.

Referring to FIG. 2, a conceptual illustration of a segmentation model within a workload protection system in accordance with various embodiments of the disclosure is shown. As discussed above, segmentation can be utilized as a strategic dividing of a network into smaller, isolated segments or sub-networks. This segmentation can be applied to networks of various sizes and configurations. The embodiment depicted in FIG. 2 is a network 200 that is segmented into various segments.

In many embodiments, the network 200 can have a tenant or root scope 210 that encompasses all other segments. Within the root scope 210, an internal scope 220 and various external scopes can be segmented. In the embodiment depicted in FIG. 2, the external scopes include a partner segment 230 and an Internet segment 240. As discussed in more detail below, the external scopes and/or segments can include various services and databases.

In a number of embodiments, the internal scope 220 can include a number of segments. In the embodiment depicted in FIG. 2, the internal scope 220 includes a data center segment 250, an infrastructure services segment 260, and a cloud services segment 270. The data center segment 250 can itself comprise a production segment 280 and a common/shared services segment 290.

In some embodiments, the infrastructure services can include a plurality of segments. The embodiment depicted in FIG. 2 includes various segments such as an active directory domain controller segment 261, a file services segment 262, a security segment 263, an identity and access management segment 264, a common segment 265, a management segment 266, a jump services segment 267, a monitoring segment 268, a backup segment 269, a PKI segment 26A, a print servers segment 26B, and a networking segment 26C. As those skilled in the art will recognize, the number, amount, variety, and size of the segments in a scope can vary depending on the application desired.

Similarly, in various embodiments, the cloud services segment 270 can include a plurality of various third-party cloud services 271. Those skilled in the art will recognize that different cloud-based services can be incorporated based on the specific need. Likewise, additional embodiments may include a production segment 280 comprising a web segment 281, an app segment 282, and a database segment 283 (shown "DB"). In still more embodiments, a common/shared services segment 290 may comprise a shared databases segment 291, a SAN segment 292, and an ISCSI segment 293. Each of these segments can provide an additional layer of security and overall workload protection within a network.

Although a specific embodiment for a conceptual illustration of a segmentation model within a workload protection system suitable for carrying out the various steps, processes, methods, and operations described herein is discussed with respect to FIG. 2, any of a variety of systems and/or processes may be utilized in accordance with embodiments of the disclosure. For example, the segmentation can comprise more or fewer scopes as needed based on the desired application and each various devices associated with a particular segment may be redeployed to a new scope as needed. The scopes may be dynamically assigned. The elements depicted in FIG. 2 may also be interchangeable with other elements of FIGS. 1 and 3-12 as required to realize a particularly desired embodiment.

Figure 3:
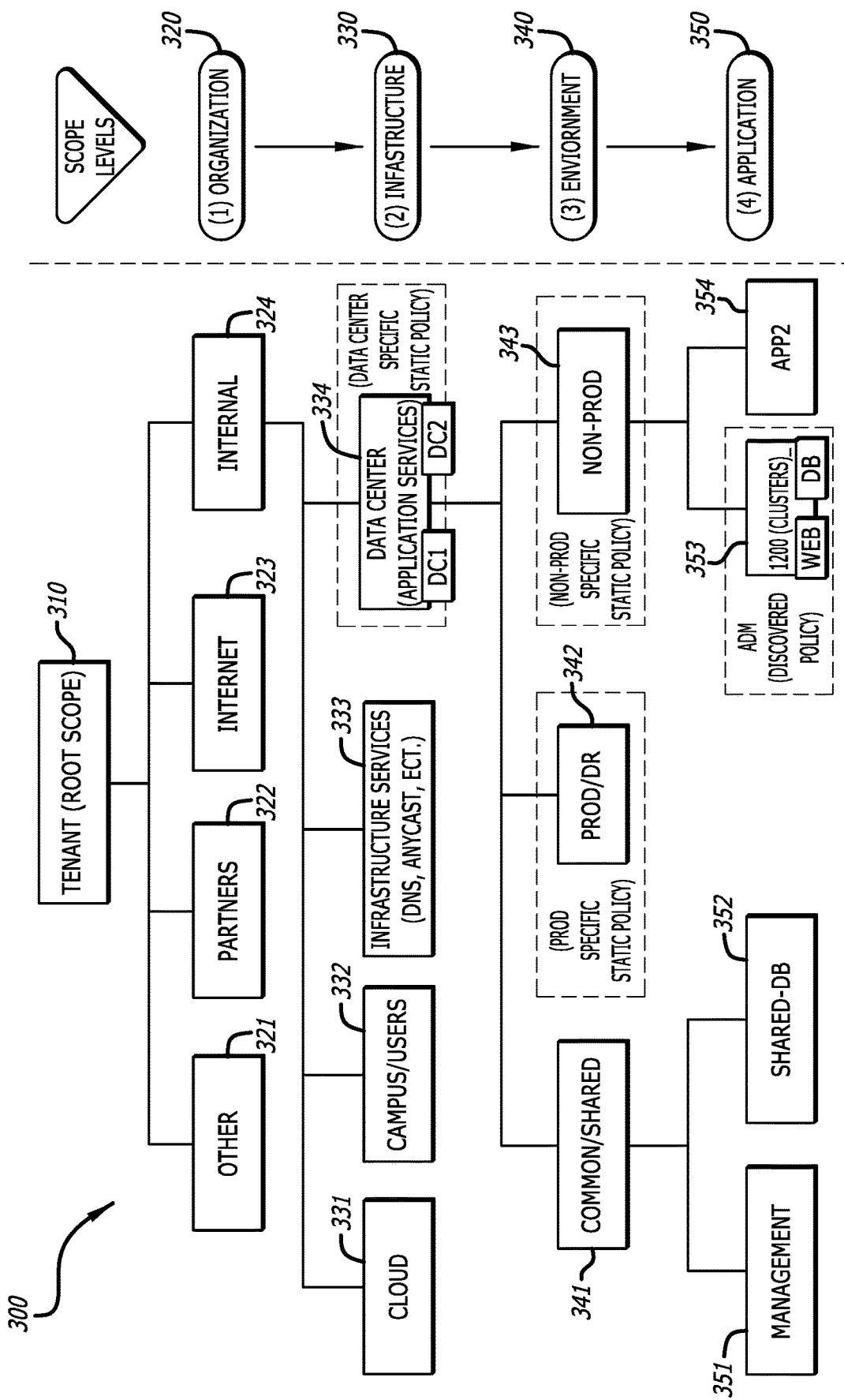
FIG. 3 is a conceptual hierarchal scope design within a workload protection system in accordance with various embodiments of the disclosure.

Referring to FIG. 3, a conceptual hierarchal scope design 300 within a workload protection system in accordance with various embodiments of the disclosure is shown. As discussed above, scopes can be configured as a collection of workloads that are organized in a hierarchal fashion. The embodiment depicted in FIG. 3 is a hierarchal scope design 300 that has an organization scope level 320, an infrastructure scope level 330, an environment scope level 340, and an application scope level 350. Each of these scope levels can be associated with a plurality of segments, applications, workloads, etc. Typically, however, each scope is nested within a tenant or root scope 310.

In the organization scope level 320, the embodiment depicted in FIG. 3 comprises an "other" segment 321, a partners segment 322, an Internet segment 323, and an internal segment 324. Each of these segments 321-324 is a child of the root scope 310. In some embodiments, the internal segment 324 can comprise a plurality of children segments that are associated with a different scope level. In the embodiment depicted in FIG. 3, the internal segment 324 has multiple children segments 331-334 that are associated with the infrastructure scope level 330. These children segments include a cloud segment 331 which can be associated with a plurality of third-party cloud-based services, a campus/users segment 332, an infrastructure services segment 323 (which is shown as including services such as, but not limited to, dynamic naming service, Anycast, and the like). The infrastructure scope level 330 may also include a data center segment 334 that can have a specific scope policy that is associated with one or more data centers such as a first data center (shown as "DC1") and a second data center (shown as "DC2") in the embodiment depicted in FIG. 3.

In further embodiments, an environment scope level 340 can be associated with a plurality of segments. In the embodiment depicted in FIG. 3, a common/shared segment 341, a production/DR segment 342, and a non-production segment 343 (shown as "Non-Prod") is associated with the environment scope level 340. Both the production/DR segment 342, and the non-production segment 343 can have a specific statis policy associated with each of them. Each of these segments 341-343 is depicted as being a child parent of the data center segment 334.

In more embodiments, the application scope level 350 can be associated with segments that are children of segments within the environment scope level 340. In the embodiment depicted in FIG. 3, the common/shared segment 341 has two children segments as a management segment 351 and a shared database segment 352 (shown as "Shared-DB"). Likewise, the nonproduction segment 343 can have two children segments in a cluster segment 353 (shown as "1200 (clusters) . . . ), and a second application scope 354 (shown as "APP2"). Furthermore, within the cluster segment 353, specific web or database services (shown as "DB") can be associated with the segment that has an application dependency map applied as a discovered policy (shown as "ADM"). This hierarchal nature can aid a network or system administrator to visualize and understand relationships between various segments, allowing for more efficient application of network policies, providing increased network security.

Although a specific embodiment for a conceptual hierarchal scope design within a workload protection system suitable for carrying out the various steps, processes, methods, and operations described herein is discussed with respect to FIG. 3, any of a variety of systems and/or processes may be utilized in accordance with embodiments of the disclosure. For example, scope may vary depending on the size of the network or the application desired. Additionally, the scope may change based on one or more events or user input. The elements depicted in FIG. 3 may also be interchangeable with other elements of FIGS. 1-2 and 4-12 as required to realize a particularly desired embodiment.

Figure 4:
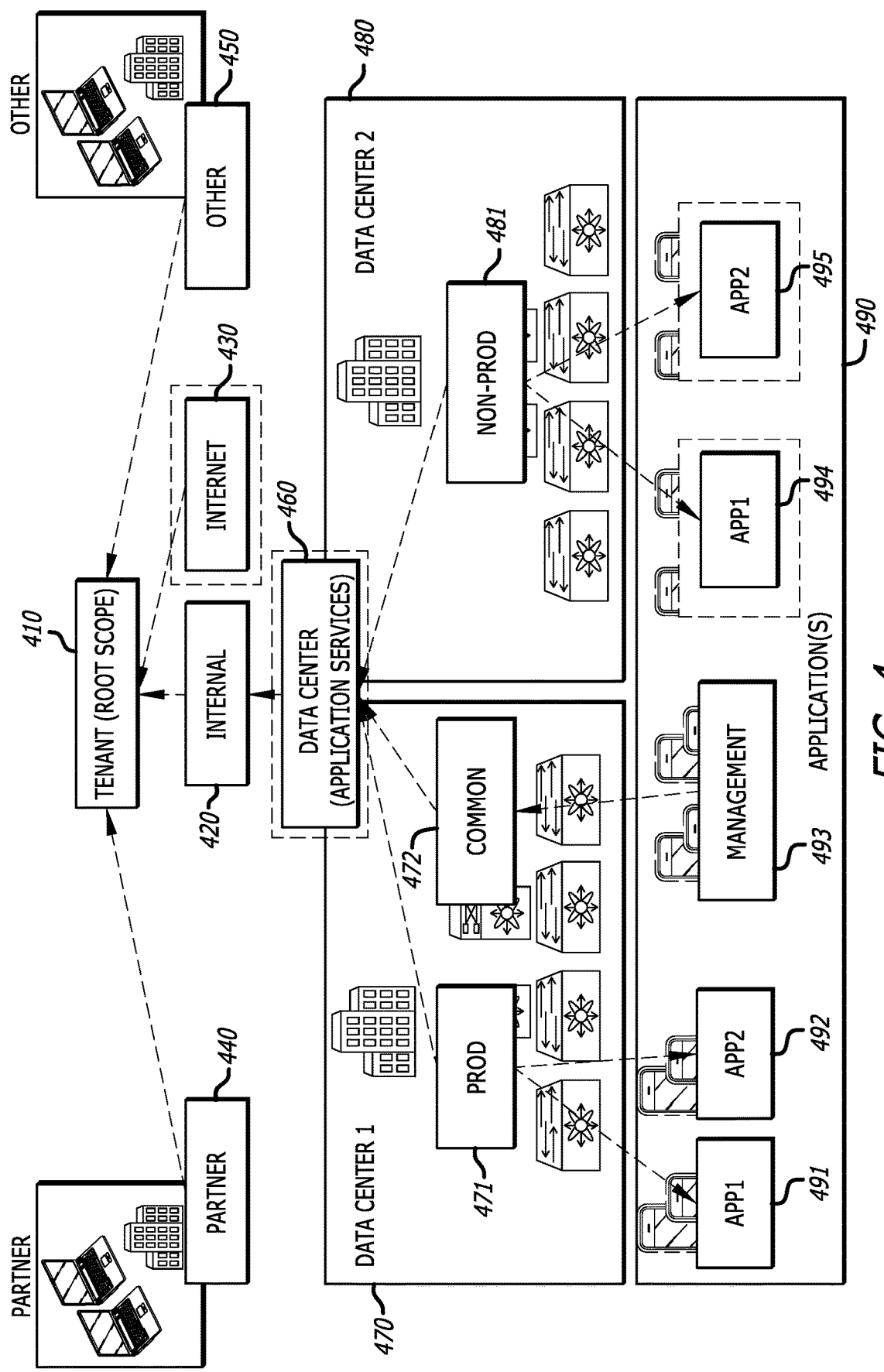
FIG. 4 is a conceptual illustration of a network topology operating with a workload protection system in accordance with various embodiments of the disclosure.

Referring to FIG. 4, a conceptual illustration of a network topology 400 operating with a workload protection system in accordance with various embodiments of the disclosure is shown. In many embodiments, the network topology 400 can include a tenant or root scope 410 which is connected to both a partner segment 440 and other segment 450 which can be external network segments. Conversely, the topology 400 can include an internal segment 420 and an Internet segment 430 that are also connected to the root scope 410.

In various embodiments, a data center segment 460 can include a plurality of data center segments. In the embodiment depicted in FIG. 4, there is a first data center segment 470 (shown as "data center 1") and a second data center segment 480 (shown as "data center 2"). The first data center segment 470 can include a production segment 471 (shown as "PROD") and a common segment 472. Each of these segments are children of the data center segment 460. Similarly, the second data center segment 480 can include a non-production segment 481 (shown as "Non-PROD"), which is also a child of the parent data center segment 460. As those skilled in the art will recognize, the number of segments and/or data centers that can be including within a topology 400 can vary based on the desired application or deployment.

In more embodiments, the topology 400 can include an application segment 490 that can include various sub-segments. In the embodiment depicted in FIG. 4, the application segment 490 includes a first application segment 491 (shown as "APP1") and a second application segment 492 (shown as "APP2") as well as a management segment 493. Each of these segments 491-493 are children of the first data center segment 470. Specifically, the first application segment 491 and second application segment 492 are children of the parent production segment 471, while the management segment 493 is a child of the parent common segment 472. Similarly, an additional series of non-production applications can be within the application segment 490. In the embodiment depicted in FIG. 4, a third application 494 (shown as "APP3") and a fourth application 495 (shown as "APP4").

Each of these segments, as shown in the topology 400 can allow for unique policy applications that can keep the overall network more secure. As those skilled in the art will recognize, the embodiments depicted in FIGS. 2-4 are all various ways to organize, visualize, or otherwise establish a segmentation strategy for a network. Each method of laying out a segmentation strategy can provide different views or aspects that can help address any issues or remaining portions of the network that still require segmentation or securing.

Although a specific embodiment for a conceptual illustration of a network topology operating with a workload protection system suitable for carrying out the various steps, processes, methods, and operations described herein is discussed with respect to FIG. 4, any of a variety of systems and/or processes may be utilized in accordance with embodiments of the disclosure. For example, specific layout of the topology 400 can vary greatly depending on the specific network being protected. The elements depicted in FIG. 4 may also be interchangeable with other elements of FIGS. 1-3 and 5-12 as required to realize a particularly desired embodiment.

Figure 5:
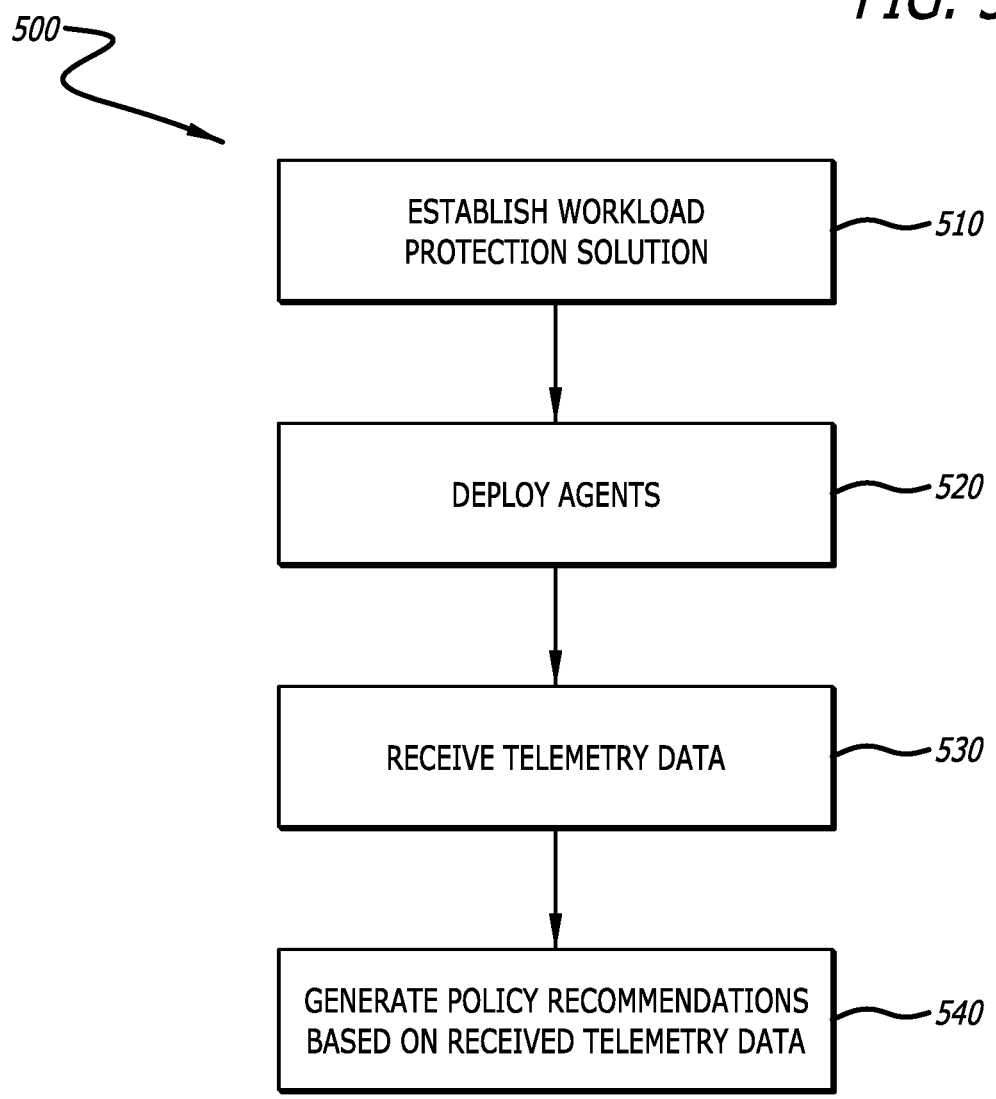
FIG. 5 is a flowchart depicting a broad process for generating a policy recommendation for a network in accordance with various embodiments of the disclosure.

Referring to FIG. 5, a flowchart depicting a broad process 500 for generating a policy recommendation for a network in accordance with various embodiments of the disclosure is shown. In many embodiments, the process 500 can establish a workload protection solution (block 510). In certain embodiments, this can allow make a zero-trust configuration achievable by consistently and accurately enforcing various levels of segmentation, including microsegmentation across an entire network, application landscape, and/or workspaces including for example, any workload and location. Indeed, an organization may establish one or more robust workload protection solutions to form a foundation for secure segmentation and/or microsegmentation. It is envisioned that such solutions are generally configured to protect and control traffic within a company's application landscape, and it typically includes features such as firewall rules, network segmentation, and threat detection mechanisms. In various embodiments, the workload protection solution can act as an enforcer for segmentation and microsegmentation, ensuring that only authorized traffic flows between different workloads. To achieve this, some embodiments may rely on a comprehensive understanding of the application landscape, including the various workloads, their communication patterns, and the security requirements for each.

In more embodiments, the process 500 can deploy one or more agents (block 520). In certain embodiments, in response to the workload protection solution being put in place, a plurality of agents may be deployed across an entity's infrastructure. In many embodiments, the agents may be responsible for collecting telemetry data that can be utilized for a segmentation and/or microsegmentation process. The agents may be configured to be installed on servers, endpoints, or other relevant devices, and they are configured to capture detailed information about network traffic, application behavior, and any potential security anomalies. In additional embodiments, the agents may be further configured to act as the metaphorical eyes and ears of the system, continuously monitoring and reporting on the network's activity. The agent deployment strategy may consider scalability, compatibility, and coverage across the entire application landscape.

In additional embodiments, the process 500 can receive telemetry data (block 530). It is envisioned that the deployed agents may be configured to actively collect telemetry data from their designated endpoints and workloads. In some embodiments, this data can encompasses a wide range of information, including, but not limited to, network flows, packet captures, application usage, user behaviors, and threat indicators. The telemetry data may be communicated or otherwise transmitted to a central repository or processing system within the organization's infrastructure. It should be appreciated that this data is often securely transmitted and stored to maintain its integrity and confidentiality. This influx of real-time telemetry information can provide a comprehensive view of the network's activities, allowing for more informed decision-making.

In more embodiments, the process 500 can generate policy recommendations based on received telemetry data (block 540). In some embodiments, in response to the telemetry data being collected and centralized, the process 500 may begin analyzing the data to generate policy recommendations. In this way, the segmentation and microsegmentation can be configured to help ensure that security policies align with actual traffic patterns and risk profiles. In some embodiments, one or more machine learning algorithms and rule engines may be utilized to process the telemetry data to identify and classify traffic, recognize anomalies, and assess security risks. Based on this analysis, the system may generate policy recommendations that specify how different workloads and applications should communicate. These policy recommendations may include defining firewall rules, segmenting the network, and specifying access control lists. In many embodiments, such recommendations are dynamic, allowing the organization to adapt its security posture in response to changing network conditions and threats.

Although a specific embodiment for generating a policy recommendation for a network suitable for carrying out the various steps, processes, methods, and operations described herein is discussed with respect to FIG. 5, any of a variety of systems and/or processes may be utilized in accordance with embodiments of the disclosure. For example, the workload protection solution may be implemented at the establishment of a network, but may also be applied to a pre-existing network. The elements depicted in FIG. 5 may also be interchangeable with other elements of FIGS. 1-4 and 6-12 as required to realize a particularly desired embodiment.

Figure 6:
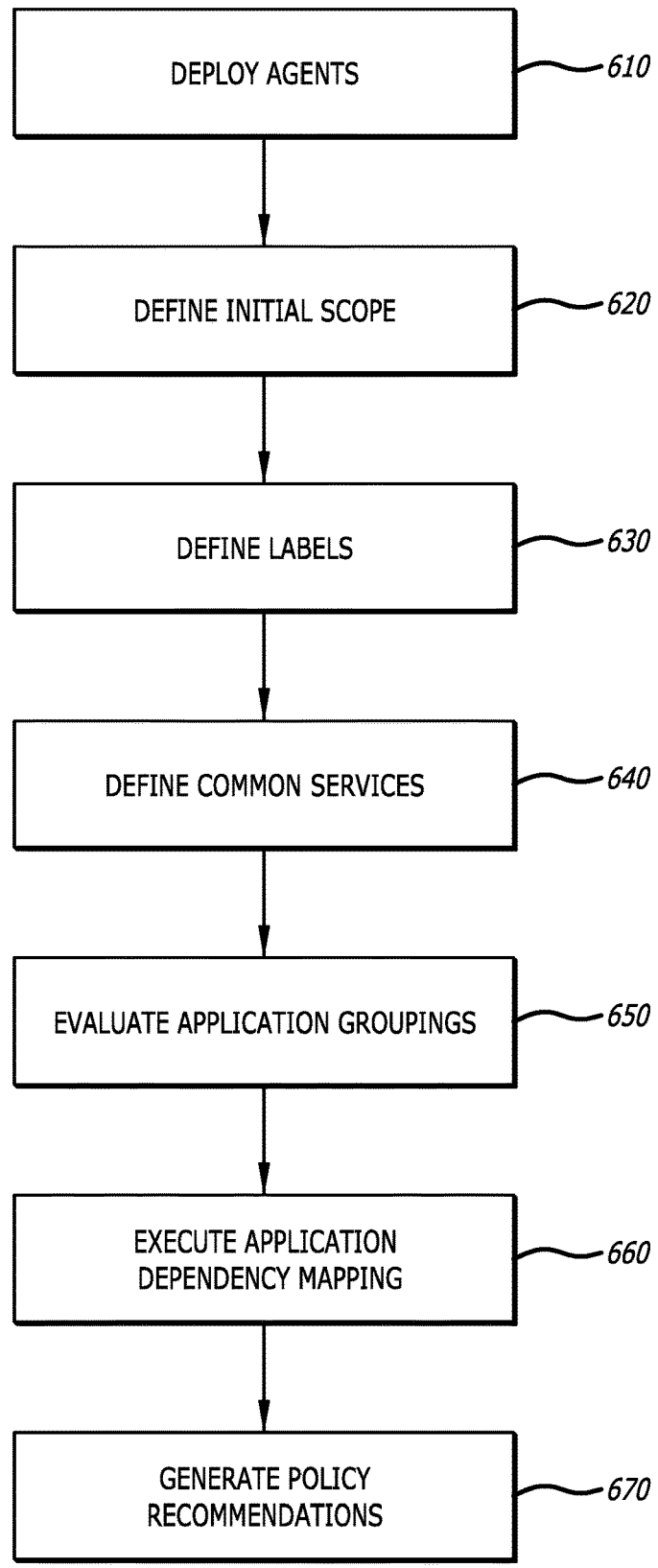
FIG. 6 is a flowchart depicting a more-detailed process for generating a policy recommendation for a network in accordance with various embodiments of the disclosure.

Referring to FIG. 6, a flowchart depicting a more-detailed process 600 for generating a policy recommendation for a network in accordance with various embodiments of the disclosure is shown. In many embodiments, the process 600 can deploy one or more agents (block 610). This deployment can be done strategically across a network infrastructure. It should be appreciated that the agents can be configured to be useful in capturing real-time telemetry data, thereby allowing for continuous monitoring and assessment of network traffic and application behavior. In certain embodiments, the deployment may be extensive, covering all critical endpoints and workloads. In further embodiments, it may be essential to maintain a balance between the number of agents deployed and the organization's scalability and resource constraints. In some embodiments, the agents may be configured as the eyes and ears of the workload protection solution.

In additional embodiments, the process 600 can define an initial scope (block 620). Often, this can be done in response to the agents being deployed. Defining an initial scope can involve identifying the specific applications, workloads, or network segments that will be the primary focus for policy development and enforcement. The scope can be configured to consider the criticality of applications, data sensitivity, and compliance requirements. In some embodiments, defining an initial scope can help ensure that subsequent segmentation and/or microsegmentation is configured in a controlled and manageable manner, which can avoid excessive complexity and disruption to existing operations.

In more embodiments, the process 600 can define labels (block 630). As those skilled in the art will recognize, labeling can be an important aspect of segmentation and/or microsegmentation, allowing for the clear identification and categorization of different workloads, applications, and assets within the network. In many embodiments, the organization can establish a labeling system that defines how these entities are identified and classified. Labels can include attributes such as application types, data classifications, sensitivity levels, and business units. The labeling process may provide an important context for creating and enforcing policies based on a granular understanding of the assets and their interrelationships.

In additional embodiments, the process 600 can define common services (block 640). To ensure efficient and secure communication between workloads and applications, it can be important to define various common services. In many embodiments, common services can encompass functions such as authentication, DNS, NTP, and directory services, which multiple workloads and applications rely on. By clearly defining common services and their access requirements, the organization can streamline policy creation and minimize potential disruptions.

In still more embodiments, the process 600 can evaluate application groupings (block 650). Before implementing segmentation and/or microsegmentation policies, it should be understood that it is often crucial to assess and evaluate the grouping of applications based on their functions and dependencies. In many embodiments, the organization may identify and categorize applications that frequently interact or rely on one another. This evaluation aids in establishing logical and manageable application groupings, which serve as the basis for policy creation. Grouping applications with similar communication patterns ensures that policies are effective in minimizing risk without impeding operational requirements.

In further embodiments, the process 600 can execute application dependency mapping (block 660). In many embodiments, application dependency mapping can be utilized for understanding how various applications and workloads interact within the network. In various embodiments, the organization can execute a comprehensive mapping process, identifying the dependencies between applications, services, and workloads. It should be understood that the mapping can help visualize the relationships and communication flows, enabling the creation of accurate and effective segmentation and/or microsegmentation policies. The organization may use dedicated tools or platforms to automate and streamline the mapping process, ensuring accuracy and efficiency.

In several embodiments, the process 600 may generate policy recommendations (block 670). Building on the insights gained from application dependency mapping and considering the defined scope, labels, and common services, the workload protection system can proceed to generate policy recommendations. These recommendations may be configured to specify access rules, traffic controls, and security measures for each application grouping or workload. The policies aim to strike a balance between robust security and operational efficiency, ensuring that only authorized traffic is allowed between the defined application groups. In many embodiments, policy recommendations may be configured to be dynamic and can be adapted as the network evolves, helping the organization maintain a strong security posture.

Although a specific embodiment for generating a policy recommendation suitable for carrying out the various steps, processes, methods, and operations described herein is discussed with respect to FIG. 6, any of a variety of systems and/or processes may be utilized in accordance with embodiments of the disclosure. For example, the workload protection solution can be operated from a logic housed within a network, but may also, in certain embodiments, be operated as a third-party cloud-based service. The elements depicted in FIG. 6 may also be interchangeable with other elements of FIGS. 1-5 and 7-12 as required to realize a particularly desired embodiment.

Figure 7:
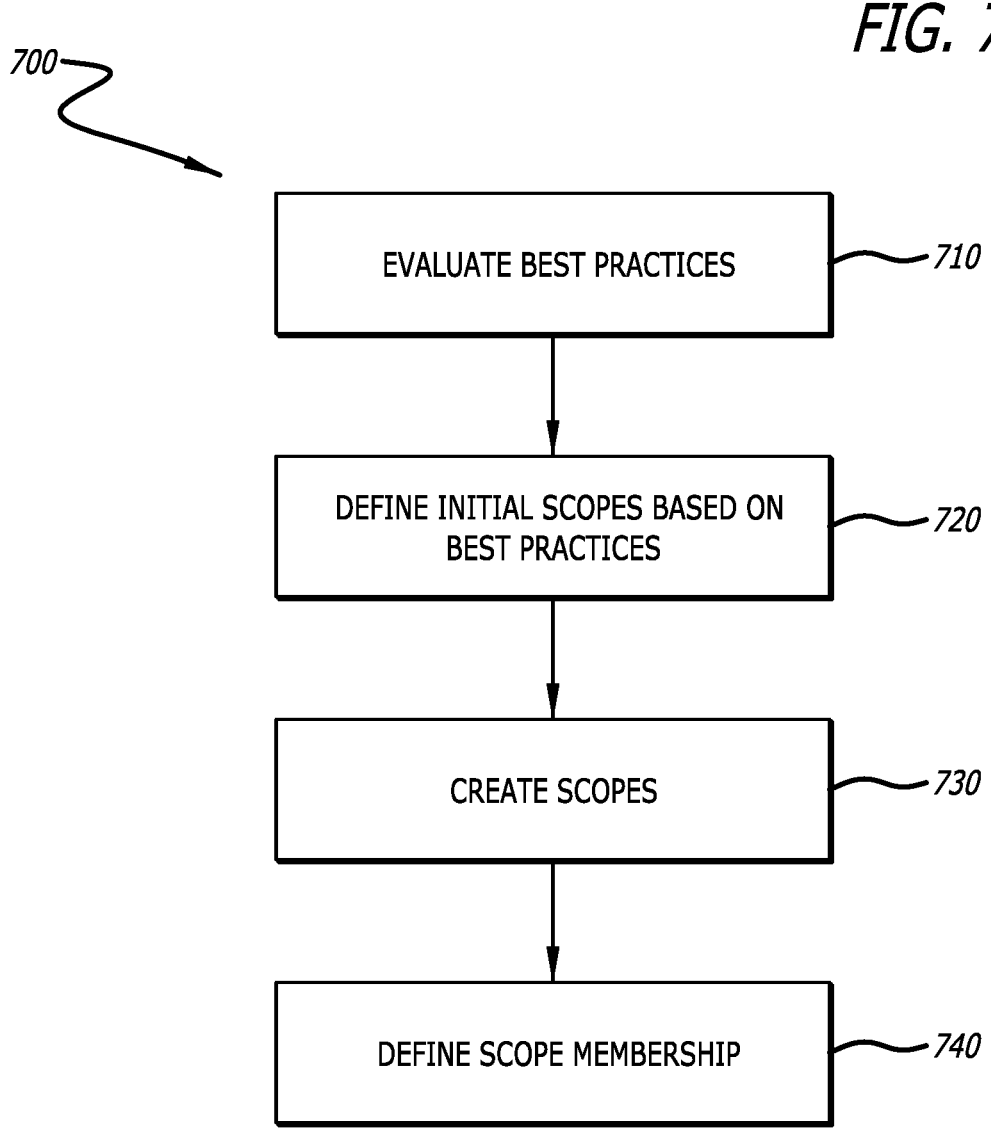
FIG. 7 is a flowchart depicting a process for defining scope memberships in accordance with various embodiments of the disclosure.

Referring to FIG. 7, a flowchart depicting a process 700 for defining scope memberships in accordance with various embodiments of the disclosure is shown. In many embodiments, the organization can evaluate best practices (block 710). In some embodiments the process 700 can take a deliberate approach to evaluate best practices for segmentation and/or microsegmentation. In general, this may involve conducting a thorough assessment of industry standards, security guidelines, and the experiences of other organizations that have successfully implemented workload protection. In many embodiments, the goal is to leverage collective wisdom and proven strategies to ensure the organization's workload protection efforts are effective and efficient. Evaluating best practices may include considerations such as selecting appropriate segmentation models, understanding regulatory compliance requirements, and studying the latest security technologies and trends. By building on best practices, the organization can avoid common pitfalls and achieve a more secure and optimized workload protection strategy.

In a number of embodiments, the process 700 can define an initial scope based on best practices (block 720). After gathering insights from best practices, the organization may proceed to define the initial scopes for its workload protection implementation. These initial scopes may be developed based on the lessons learned from industry standards and security guidelines, aligning them with the specific needs and goals of the organization. The selection of initial scopes should take into account the criticality of assets, potential threat vectors, and compliance mandates. By grounding the scope definition in best practices, the organization sets the foundation for an effective workload protection strategy that prioritizes security while minimizing operational disruptions.

In various embodiments, the process 700 can create scopes (block 730). In many embodiments, once the initial scopes are defined, the organization can proceed to create detailed scopes for workload segmentation. In general, it is envisioned that a scope may include one or more defined boundaries within the network that encompasses a set of resources, applications, or services, without limitation. In many embodiments, creating scopes involves specifying the exact assets and resources that fall within each scope and establishing the necessary access controls and segmentation rules. These scopes serve as the building blocks for workload protection policies and help ensure that each area of the network is adequately protected and controlled. The creation of scopes must be meticulously documented to provide a clear roadmap for policy implementation and ongoing management.

In additional embodiments, the process 700 can define scope memberships (block 740). Defining scope membership can be an important aspect of fine-tuning the workload protection strategy. In this step, the organization specifies the membership criteria for each scope. In many embodiments, this may include determining which assets, applications, and workloads belong to a particular scope, based on factors such as business function, data sensitivity, and communication requirements. By clearly defining scope membership, the organization can ensure that the right resources are included in each scope, allowing for granular and effective policy enforcement. Additionally, this step helps maintain the scalability and flexibility of the workload protection strategy, as it enables changes and adjustments to scope membership as the organization's needs evolve over time.

Although a specific embodiment for defining scope memberships suitable for carrying out the various steps, processes, methods, and operations described herein is discussed with respect to FIG. 7, any of a variety of systems and/or processes may be utilized in accordance with embodiments of the disclosure. For example, the definition of scopes can be done via responding to one or more user input prompts, or can be done, at least in part, automatically. The elements depicted in FIG. 7 may also be interchangeable with other elements of FIGS. 1-6 and 8-12 as required to realize a particularly desired embodiment.

Figure 8:
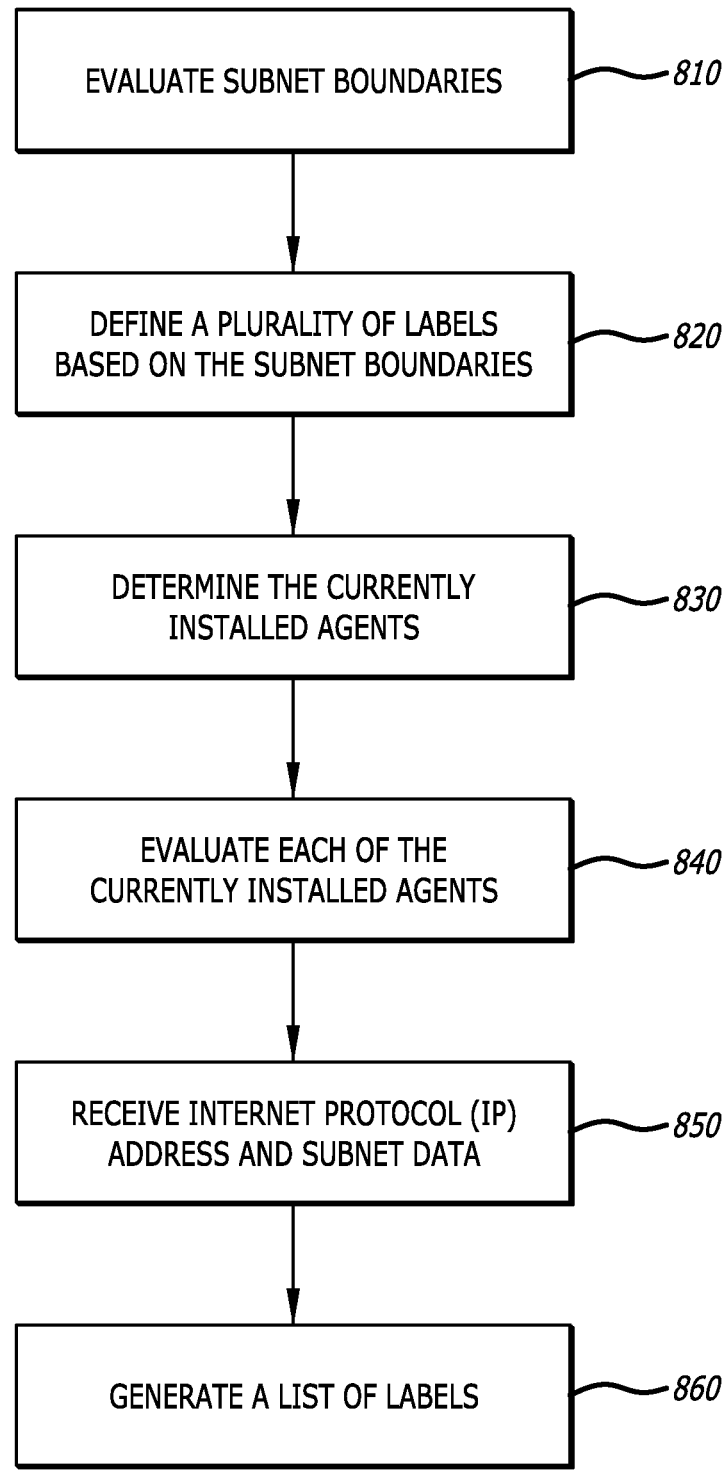
FIG. 8 is a flowchart depicting a process for defining a list of labels in accordance with various embodiments of the disclosure.

Referring to FIG. 8, a flowchart depicting a process 800 for defining a list of labels in accordance with various embodiments of the disclosure is shown. In many embodiments, the process 800 can evaluate subnet boundaries (block 810). This evaluation may be done on one or more subnet boundaries within a network infrastructure. It should be appreciated that subnets are logical divisions of an IP network, and understanding their boundaries is crucial for effective segmentation and/or microsegmentation. By assessing and, if necessary, adjusting these boundaries, the organization can ensure that resources are appropriately grouped together based on their proximity and communication requirements. In many embodiments, evaluating subnet boundaries can help establish the foundation for more efficient and coherent workload protection, enabling the organization to create security policies that align with the network's actual structure and traffic patterns.

In a number of embodiments, the process 800 can define a plurality of labels based on the subnet boundaries (block 820). It should be understood that once the subnet boundaries have been evaluated and potentially adjusted, the organization can proceed to define a multitude of labels that correspond to these boundaries. Labels are often used to categorize and identify different resources, workloads, and subnets within the network. Based on the revised subnet boundaries, the organization may assign one or more labels that reflect the functional, security, and communication characteristics of each subnet. These labels can provide the necessary context for creating and enforcing workload protection policies, ensuring that resources within the same subnet share common attributes and security requirements.

In various embodiments, the process 800 can determine the currently installed agents (block 830). In some embodiments, before proceeding with segmentation and/or microsegmentation, the organization can first determine the agents that are currently installed across its infrastructure. This determination may include identifying the endpoints, servers, and devices where telemetry agents have been deployed. In certain embodiments, a comprehensive inventory of installed agents may be relied upon to ensure that all or substantially all relevant network activity is being monitored and that telemetry data is collected from all critical points. It should be appreciated that this assists with effective data collection process and helps maintain transparency in the workload protection effort.

In more embodiments, the process 800 can evaluate each of the currently installed agents (block 840). Following the determination of installed agents, the organization can proceed to evaluate each of these agents individually. In many embodiments, the evaluation may include assessing the agents' performance, configuration, and compatibility with the workload protection system. This step ensures that the agents are functioning optimally and are configured to capture relevant telemetry data without causing any disruptions to the network. It is envisioned that any necessary updates or adjustments to the agents can be made during this evaluation, ensuring the reliability and accuracy of the data collection process.

In further embodiments, the process 800 can receive internet protocol (IP) address and subnet data (block 850). In certain embodiments, an organization can receive detailed information regarding IP addresses and subnet data for all resources within its network. This data can be important for the workload protection process as it helps identify and categorize network assets accurately. The IP address and subnet data may be utilized to map resources to their corresponding labels, scopes, and policies. In additional embodiments, accurate and up-to-date IP and subnet information is crucial for maintaining the integrity of the workload protection strategy, enabling precise policy enforcement.

In still additional embodiments, the process 800 can generate a list of labels (block 860). Based on the received IP address and subnet data, the organization can generate a comprehensive list of labels that correspond to different resources, subnets, and assets within the network. In many embodiments, the labels may be used to categorize and classify network elements, aiding in the creation of segmentation and/or microsegmentation policies. The generated list of labels may serve as a reference point for defining scope membership, access controls, and communication rules, ensuring that policies are accurately applied to protect the network and its assets. This may form a bridge between network structure and security policy enforcement, providing the necessary context for effective workload protection.

Although a specific embodiment for defining a list of labels suitable for carrying out the various steps, processes, methods, and operations described herein is discussed with respect to FIG. 8, any of a variety of systems and/or processes may be utilized in accordance with embodiments of the disclosure. For example, various elements of the process 800 may be generated based on user input, but may also be automatically generated in various embodiments. The elements depicted in FIG. 8 may also be interchangeable with other elements of FIGS. 1-7 and 9-12 as required to realize a particularly desired embodiment.

Figure 9:
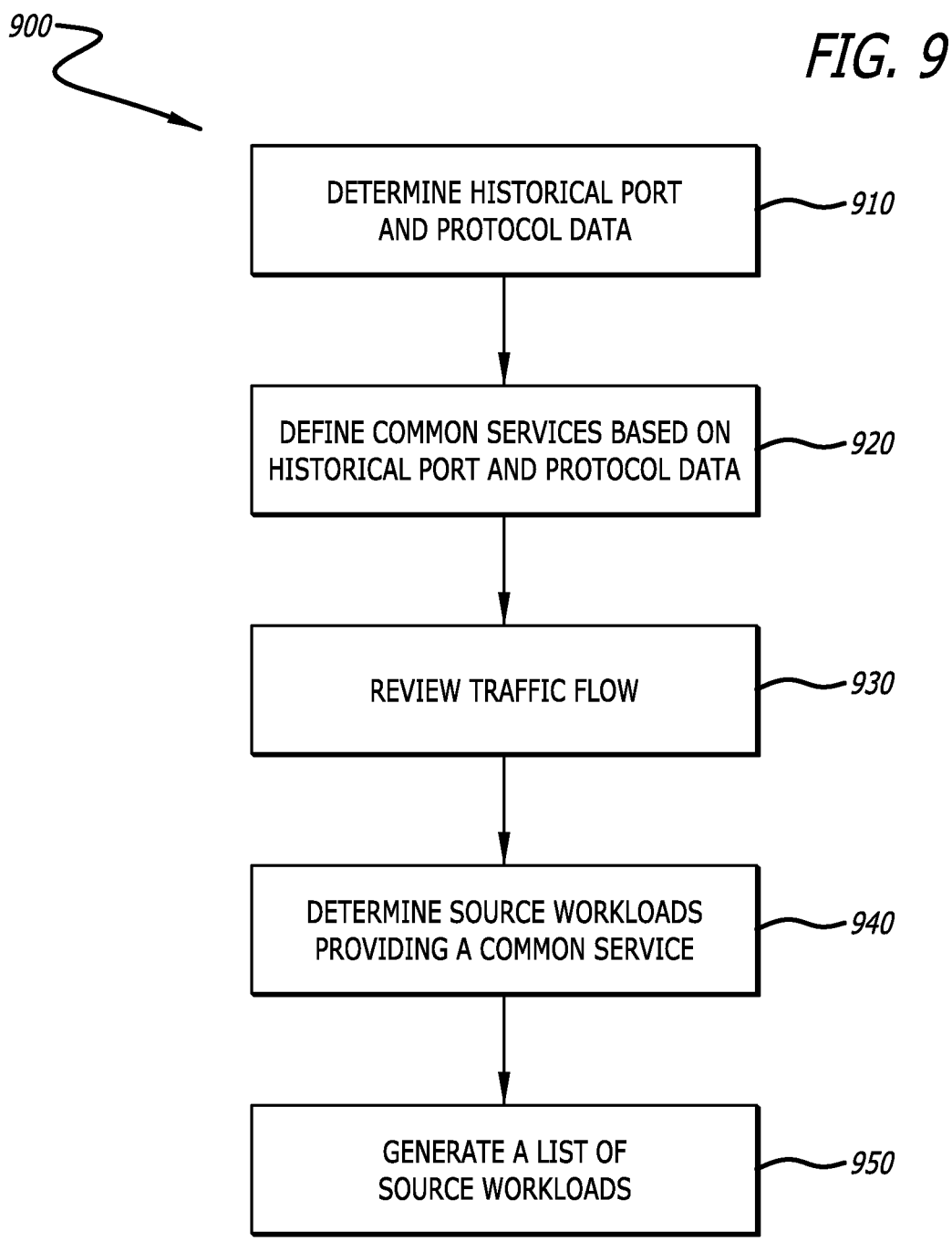
FIG. 9 is a flowchart depicting a process for defining common services in accordance with various embodiments of the disclosure.

Referring to FIG. 9, a flowchart depicting a process 900 for defining common services in accordance with various embodiments of the disclosure is shown. In many embodiments, the process 900 can determine historical port and protocol data (block 910). In certain embodiments, the organization can delve into historical network data to determine the ports and protocols that have been historically used for communication within the network. Analyzing historical data can help identify common patterns and trends in network traffic, shedding light on the specific ports and protocols that applications and workloads have used for their communication. It is envisioned that historical port and protocol data may serve as a valuable resource for finetuning workload protection policies, as it provides insights into the network's behavior over time, allowing for more accurate and effective rule creation.

In a number of embodiments, the process 900 can define common services based on known historical port and protocol data (block 920). Building on the insights gained from the historical port and protocol data, the organization proceeds to define common services that are based on these historical patterns. In many embodiments, common services encompass the key functions and communication methods that various applications and workloads within the network rely on. By referencing historical data, the organization can identify the services that have been consistently used and categorize them into common service groups. It should be appreciated that the forgoing is very useful in streamlining workload protection policies, as it helps ensure that common services are adequately addressed and that policies align with actual network behavior.

In additional embodiments, the process 900 can review traffic flow (block 930). In many embodiments, this can be done to gain a deeper understanding of network behavior and communication patterns, the organization reviews the traffic flow within its network. In more embodiments, this review can include analyzing real-time network data to identify how applications and workloads interact and the routes they take. By monitoring the traffic flow, the organization can identify any deviations from historical patterns, detect anomalies, and ensure that policies are accurately enforcing the intended security and segmentation measures. The review of traffic flow is an ongoing process, essential for maintaining a secure and optimized workload protection strategy.

In various embodiments, the process 900 can determine source workloads providing a common service (block 940). In some embodiments, the organization can identify the source workloads within the network that are responsible for providing common service. Common services are typically offered by specific workloads, such as DNS servers, authentication servers, or application servers. It should be appreciated that by determining the source workloads, the organization gains insights into the critical components of the network infrastructure and can establish policies that ensure their proper functioning and security.

In more embodiments, the process 900 can generate a list of source workloads (block 950). Based on the identification of source workloads providing common services, the organization can proceed in certain embodiments to generate a comprehensive list of these source workloads. This list may serve as a reference point for policy creation, ensuring that the organization can create specific rules and access controls that safeguard the source workloads and the services they provide. In many embodiments, an accurate identification of source workloads helps maintain the integrity of the workload protection strategy and ensures that the network's critical components remain protected from potential security threats.

Although a specific embodiment for defining common services suitable for carrying out the various steps, processes, methods, and operations described herein is discussed with respect to FIG. 9, any of a variety of systems and/or processes may be utilized in accordance with embodiments of the disclosure. For example, the review of traffic flow can be done over a predetermined period time or manually checked based on a given start and end time. The elements depicted in FIG. 9 may also be interchangeable with other elements of FIGS. 1-8 and 10-12 as required to realize a particularly desired embodiment.

Figure 10:
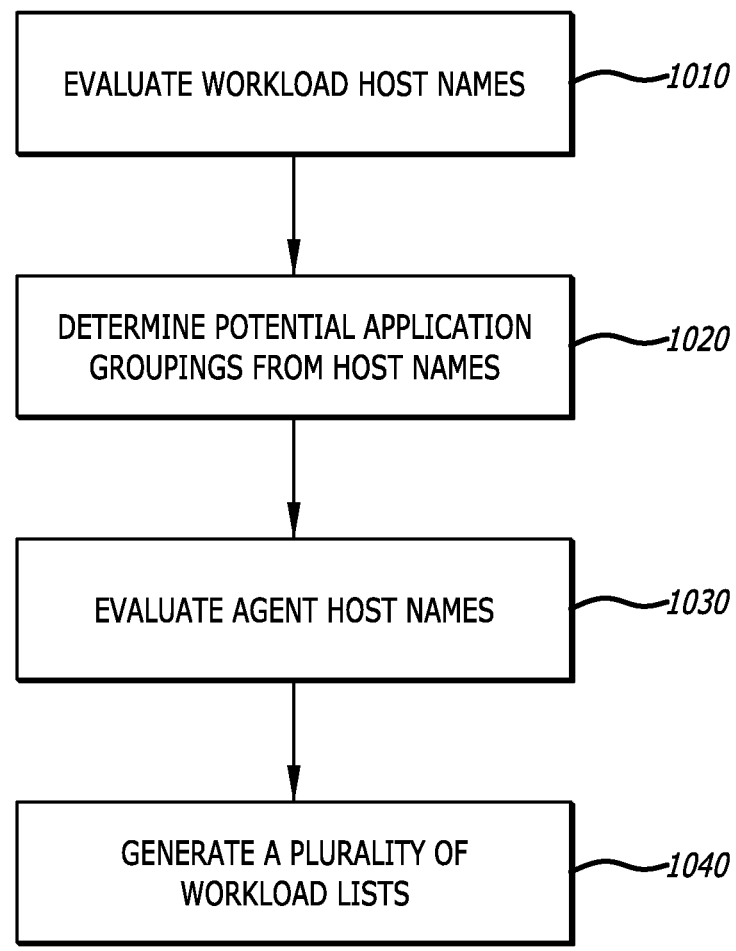
FIG. 10 is a flowchart depicting a process for application grouping in accordance with various embodiments of the disclosure.

Referring to FIG. 10, a flowchart depicting a process 1000 for application grouping in accordance with various embodiments of the disclosure is shown. In many embodiments, the process 1000 can evaluate workload host names (block 1010). In certain embodiments, an organization can focus on evaluating the host names associated with its workloads. It should be understood that host names can provide valuable information about the identity and function of each workload within the network. By examining host names, an organization can gain insights into how workloads are identified and categorized, for example. In some embodiments, the evaluation may involve reviewing naming conventions and naming patterns used within the organization. In general, host name analysis can be an important aspect of workload protection solutions, as it may assist in the accurate identification and labeling of workloads, ensuring that security policies are applied to the right assets.

In a number of embodiments, the process 1000 can generate a plurality of workload lists (block 1020). Building on the evaluation of workload host names, the organization can proceed to determine potential application groupings based on these host names. Workload host names may often provide clues about the applications and services they support. In some embodiments, by analyzing these host names, the organization can begin to identify which workloads are part of the same application or service group. This information may be valuable for grouping workloads with similar communication requirements and security considerations, forming the foundation for effective workload protection policies.

In several embodiments, the process 1000 can evaluate agent host names (block 1030). In a similar fashion to evaluating workload host names, the organization can evaluate the host names associated with the telemetry agents deployed across its infrastructure. Agent host names can provide insights into the role and location of each agent. In many embodiments, by assessing these host names, the organization ensures that agents are properly identified and categorized, which is essential for collecting telemetry data accurately and associating it with the right workloads and applications. Agent host name evaluation can contribute to the overall accuracy of the workload protection strategy.

In further embodiments, the process 1000 can generate a plurality of workload lists (block 1040). In some embodiments, after evaluating both workload and agent host names, an organization can proceed to generate a variety of workload lists. These lists may categorize workloads based on different criteria, such as application groupings, agent locations, and naming conventions. Often, an example goal may be to create a structured and organized system for managing workloads and their associated data. These workload lists can serve as references for policy creation, ensuring that workload protection policies may align with the organization's internal naming conventions and categorization methods. In certain embodiments, a plurality of workload lists can help streamline the policy enforcement process and enhances the accuracy of the workload protection strategy.

Although a specific embodiment for application grouping suitable for carrying out the various steps, processes, methods, and operations described herein is discussed with respect to FIG. 10, any of a variety of systems and/or processes may be utilized in accordance with embodiments of the disclosure. For example, the workload lists may be provided to a network administrator for approval and/or review prior to be utilized. The elements depicted in FIG. 10 may also be interchangeable with other elements of FIGS. 1-9 and 11-12 as required to realize a particularly desired embodiment.

Figure 11:
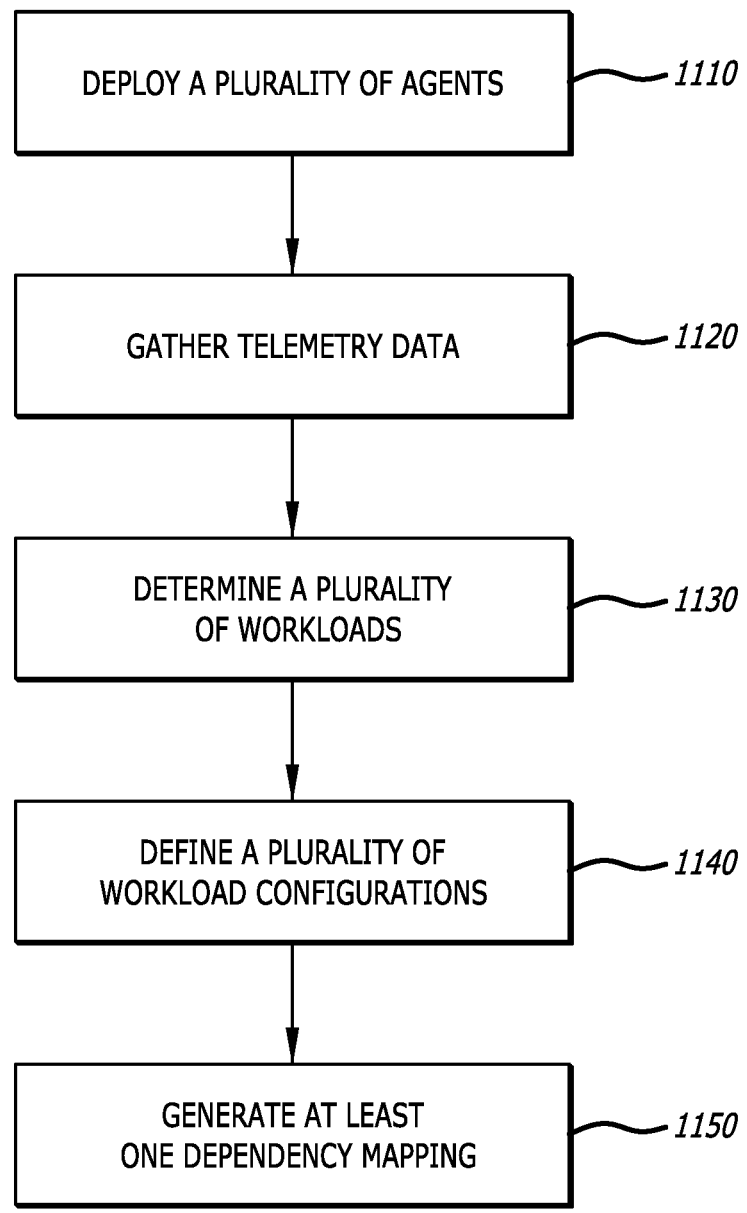
FIG. 11 is a flowchart depicting a process for generating application dependency mapping in accordance with various embodiments of the disclosure.

Referring to FIG. 11, a flowchart depicting a process 1100 for generating application dependency mapping in accordance with various embodiments of the disclosure is shown. In many embodiments, an organization can take the initiative to deploy a multitude of agents across its network infrastructure (block 1110). These agents may be strategically positioned on servers, endpoints, and other critical devices to ensure comprehensive coverage. Their primary function is to collect telemetry data, capturing critical information about network traffic, application behavior, and security events. Deploying a plurality of agents may be essential for thorough network monitoring and segmentation and/or microsegmentation. In many embodiments, such configuration may ensure that no part of the network remains unmonitored, contributing to the accuracy and effectiveness of subsequent workload protection efforts.

In a number of embodiments, the process 1100 can gather telemetry data (block 1120). With agents deployed, the process 1100 may begin the process of gathering telemetry data. In many embodiments, telemetry data can include a wide range of information such as network flows, packet captures, application usage, and user behaviors. This data may be beneficial for understanding how different workloads and applications interact within the network. It may also form a basis for creating segmentation and/or microsegmentation policies that are grounded in actual network behavior. The quality and timeliness of telemetry data collection can be helpful for making informed decisions and maintaining a secure and efficient network environment.

In several embodiments, the process 1100 can determine a plurality of workloads (block 1130). In certain embodiments, the organization can determine a multitude of workloads within its network. Workloads encompass applications, services, and resources that are actively used within the organization. It should be understood that by identifying a wide array of workloads, the organization gains a comprehensive view of its network landscape, enabling the creation of segmentation and/or microsegmentation policies that address many critical areas. This can help to ensure that no workload is left unaccounted for, reducing the risk of security blind spots and facilitating an inclusive and effective workload protection strategy.

In various embodiments, the process 1100 can define a plurality of workload configurations (block 1140). In some embodiments, after determining the diverse workloads within the network, the organization proceeds to define a range of workload configurations. In many embodiments, workload configurations encompass the specific attributes and characteristics of each workload, such as data sensitivity, communication requirements, and security needs. It is contemplated that by defining multiple workload configurations, the organization can tailor workload protection policies that can be configured to meet the unique demands of different workloads, ensuring that security measures are appropriately applied and not overly restrictive for some while inadequate for others.

In more embodiments, the process 1100 can generate at least one dependency mapping (block 1150). In various embodiments, to create effective workload protection policies, an organization may generate at least one dependency mapping. Dependency mapping can visually illustrate how different workloads and applications within the network interact and rely on one another. By mapping these dependencies, the organization can identify critical communication paths, potential vulnerabilities, and areas where strong segmentation is required. Dependency mappings can help in the precise design of access controls and security rules, ensuring that policies are both comprehensive and accurately aligned with the network's structure and requirements.

Although a specific embodiment for generating application dependency mapping suitable for carrying out the various steps, processes, methods, and operations described herein is discussed with respect to FIG. 11, any of a variety of systems and/or processes may be utilized in accordance with embodiments of the disclosure. For example, the dependency mapping may be generated internally within a localized workload protection solution. However, in certain embodiments, the application dependency mapping may be generated by a third-party, such as through a cloud-based service. The elements depicted in FIG. 11 may also be interchangeable with other elements of FIGS. 1-10 and 12 as required to realize a particularly desired embodiment.

Figure 12:
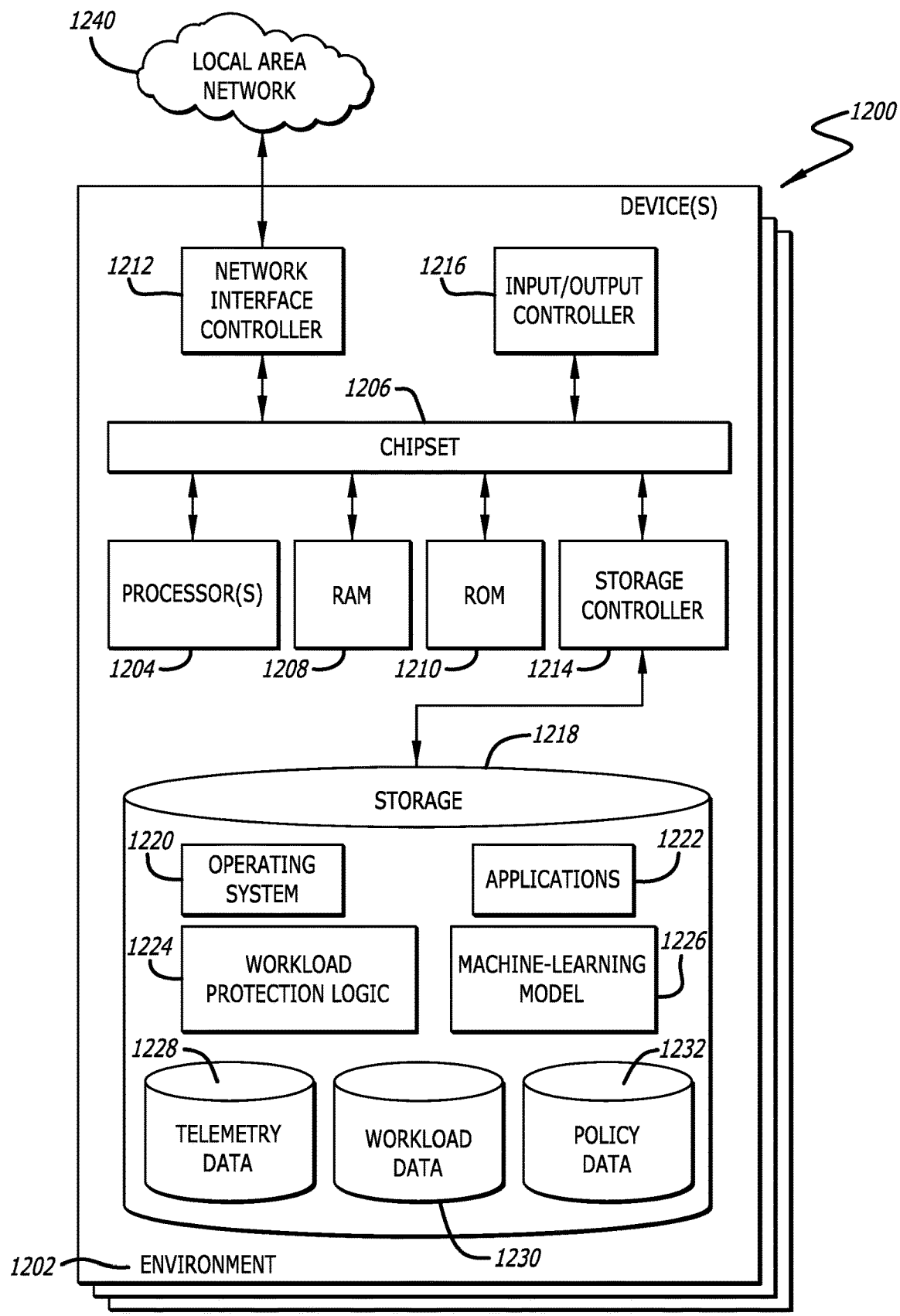
FIG. 12 is a conceptual block diagram of a device suitable for configuration with a workload protection logic in accordance with various embodiments of the disclosure.

Referring to FIG. 12, a conceptual block diagram of a device 1200 suitable for configuration with a workload protection logic 1224 in accordance with various embodiments of the disclosure is shown. The embodiment of the conceptual block diagram depicted in FIG. 12 can illustrate a conventional server computer, workstation, desktop computer, laptop, tablet, network device, access point, router, switch, e-reader, smart phone, centralized management service, or other computing device, and can be utilized to execute any of the application and/or logic components presented herein. The device 1200 may, in some examples, correspond to physical devices and/or to virtual resources and embodiments described herein.

In many embodiments, the device 1200 may include an environment 1202 such as a baseboard or "motherboard," in physical embodiments that can be configured as a printed circuit board with a multitude of components or devices connected by way of a system bus or other electrical communication paths. Conceptually, in virtualized embodiments, the environment 1202 may be a virtual environment that encompasses and executes the remaining components and resources of the device 1200. In more embodiments, one or more processors 1204, such as, but not limited to, central processing units ("CPUs") can be configured to operate in conjunction with a chipset 1206. The processor(s) 1204 can be standard programmable CPUs that perform arithmetic and logical operations necessary for the operation of the device 1200.

In additional embodiments, the processor(s) 1204 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1206 may provide an interface between the processor(s) 1204 and the remainder of the components and devices within the environment 1202. The chipset 1206 can provide an interface to communicatively couple a random-access memory ("RAM") 1208, which can be used as the main memory in the device 1200 in some embodiments. The chipset 1206 can further be configured to provide an interface to a computer-readable storage medium such as a read-only memory ("ROM") 1210 or non-volatile RAM ("NVRAM") for storing basic routines that can help with various tasks such as, but not limited to, starting up the device 1200 and/or transferring information between the various components and devices. The ROM 1210 or NVRAM can also store other application components necessary for the operation of the device 1200 in accordance with various embodiments described herein.

Different embodiments of the device 1200 can be configured to operate in a networked environment using logical connections to remote computing devices and computer systems through a network, such as the network 1240. The chipset 1206 can include functionality for providing network connectivity through a network interface card ("NIC") 1212, which may comprise a gigabit Ethernet adapter or similar component. The NIC 1212 can be capable of connecting the device 1200 to other devices over the network 1240. It is contemplated that multiple NICs 1212 may be present in the device 1200, connecting the device to other types of networks and remote systems.

In further embodiments, the device 1200 can be connected to a storage 1218 that provides non-volatile storage for data accessible by the device 1200. The storage 1218 can, for example, store an operating system 1220, applications 1222, and data 1228, 1230, 1232, which are described in greater detail below. The storage 1218 can be connected to the environment 1202 through a storage controller 1214 connected to the chipset 1206. In certain embodiments, the storage 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1200 can store data within the storage 1218 by transforming the physical state of the physical storage units to reflect the information being stored. The specific transformation of physical state can depend on various factors. Examples of such factors can include, but are not limited to, the technology used to implement the physical storage units, whether the storage 1218 is characterized as primary or secondary storage, and the like.

For example, the device 1200 can store information within the storage 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1200 can further read or access information from the storage 1218 by detecting the physical states or characteristics of one or more particular locations within the physical storage units.

In addition to the storage 1218 described above, the device 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1200. In some examples, the operations performed by a cloud computing network, and or any components included therein, may be supported by one or more devices similar to device 1200. Stated otherwise, some or all of the operations performed by the cloud computing network, and or any components included therein, may be performed by one or more devices 1200 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1218 can store an operating system 1220 utilized to control the operation of the device 1200. According to one embodiment, the operating system comprises the LINUX operating system. According to another embodiment, the operating system comprises the WINDOWS® SERVER operating system from MICROSOFT Corporation of Redmond, Washington.

According to further embodiments, the operating system can comprise the UNIX operating system or one of its variants. It should be appreciated that other operating systems can also be utilized. The storage 1218 can store other system or application programs and data utilized by the device 1200.

In various embodiment, the storage 1218 or other computer-readable storage media is encoded with computer-executable instructions which, when loaded into the device 1200, may transform it from a general-purpose computing system into a special-purpose computer capable of implementing the embodiments described herein. These computer-executable instructions may be stored as application 1222 and transform the device 1200 by specifying how the processor(s) 1204 can transition between states, as described above. In some embodiments, the device 1200 has access to computer-readable storage media storing computer-executable instructions which, when executed by the device 1200, perform the various processes described above with regard to FIGS. 1-8. In more embodiments, the device 1200 can also include computer-readable storage media having instructions stored thereupon for performing any of the other computer-implemented operations described herein.

In still further embodiments, the device 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can be configured to provide output to a display, such as a computer monitor, a flat panel display, a digital projector, a printer, or other type of output device. Those skilled in the art will recognize that the device 1200 might not include all of the components shown in FIG. 12 and can include other components that are not explicitly shown in FIG. 12 or might utilize an architecture completely different than that shown in FIG. 12.

As described above, the device 1200 may support a virtualization layer, such as one or more virtual resources executing on the device 1200. In some examples, the virtualization layer may be supported by a hypervisor that provides one or more virtual machines running on the device 1200 to perform functions described herein. The virtualization layer may generally support a virtual resource that performs at least a portion of the techniques described herein.

In many embodiments, the device 1200 can include a workload protection logic 1224 that can be configured to perform one or more of the various steps, processes, operations, and/or other methods that are described above. While the embodiment shown in FIG. 12 depicts a logic focused on workload protection, it is contemplated that a more general "cybersecurity" logic may be utilized as well or in lieu of such logic. Often, the workload protection logic 1224 can be a set of instructions stored within a non-volatile memory that, when executed by the controller(s)/processor(s) 1204, can carry out these steps, etc. In some embodiments, the workload protection logic 1224 may be a client application that resides on a network-connected device, such as, but not limited to, a server, switch, personal or mobile computing device in a single or distributed arrangement. In certain embodiments, the workload protection logic 1224 can be a dedicated hardware device, cloud-based service, or be configured into a system on a chip package (FPGA, ASIC and the like).

In a number of embodiments, the storage 1218 can include telemetry data 1228. As discussed above, the telemetry data 1228 can be collected in a variety of ways and may involve data related to multiple network devices. The telemetry data 1228 may be associated with an entire network or a portion/partition of a network. This may also include a relationship of the various associated devices that are associated with each other. In additional embodiments, the telemetry data 1228 can include data related to the configuration of one or more network devices, data centers, applications, or the like, including, but not limited to, IP addresses, subnets, etc. This telemetry data 1228 can be utilized by a zero-touch setup process to generate prompts, suggestions, or other interactions with a user when setting up a network for workload protection. As those skilled in the art will recognize, telemetry data 828 can be configured to track a variety of different aspects of a network, it's devices, and associated workloads.

In various embodiments, the storage 1218 can include workload data 1230. As described above, workload data 1230 can be associated with various network devices, data centers, applications, or other processes within a network. Each workload may have additional workload data 1230 associated with it including origin, status, label, scope, etc. In various embodiments, workload data 1230 may be utilized to describe additional attributes of the workload, including one of: a workload's bandwidth usage, latency, traffic patterns, quality-related metrics, throughput, performance, security-related events, resource utilization, and/or scalability traits.

In still more embodiments, the storage 1218 can include policy data 1232. As discussed above, policy data 1232 can include data that related to a network's configuration, such as hierarchy, segmentation, scope, labels, etc. In some embodiments, policy data 1232 can be associated with one of: access control, quality-related policies, security, routing, traffic shaping, authentication/authorization, compliance, data retention/backup, remote access, wireless network policies, and/or any service level agreements. Policy data 1232 can be utilized by the workload protection solution in various ways including, but not limited to, developing a segmentation policy, and/or generating one or more prompts during a zero-touch user experience.

Finally, in many embodiments, data may be processed into a format usable by a machine-learning model 1226 (e.g., feature vectors, etc.), and or other pre-processing techniques. The machine learning ("ML") model 1226 may be any type of ML model, such as supervised models, reinforcement models, and/or unsupervised models. The ML model 1226 may include one or more of linear regression models, logistic regression models, decision trees, Naïve Bayes models, neural networks, k-means cluster models, random forest models, and/or other types of ML models 1226. The ML model 1226 may be configured to learn the pattern of various telemetry and/or workload data of various network devices and generate predictions, configurations, and/or confidence levels regarding current workload segmentations. In some embodiments, the ML model 1226 can be configured to determine which method of generating those predictions would work best based on certain conditions or with certain network devices.

The ML model(s) 1226 can be configured to generate inferences to make predictions or draw conclusions from data. An inference can be considered the output of a process of applying a model to new data. This can occur by learning from at least the telemetry data, workload data, policy data, and/or the underlying algorithmic data and use that learning to predict future configurations, outcomes, and needs. These predictions are based on patterns and relationships discovered within the data. To generate an inference, such as a determination on anomalous movement, the trained model can take input data and produce a prediction or a decision/ determination. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1226 may be generated by human/ administrator verifications or may compare predicted outcomes with actual outcomes. The training set of the ML model(s) 1226 can be provided by the manufacturer prior to deployment and can be based on previously verified data.

Although a specific embodiment for a device 1200 suitable for configuration with a workload protection logic 1224 suitable for carrying out the various steps, processes, methods, and operations described herein is discussed with respect to FIG. 12, any of a variety of systems and/or processes may be utilized in accordance with embodiments of the disclosure. For example, the device may be in a virtual environment such as a cloud-based network administration suite, or it may be distributed across a variety of network devices or APs such that each acts as a device and the workload protection logic 1224 acts in tandem between the devices. The elements depicted in FIG. 12 may also be interchangeable with other elements of FIGS. 1-11 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
 a processor;
 at least one network interface controller configured to provide access to a network; and
 a memory communicatively coupled to the processor, wherein the memory comprises a workload protection logic that is configured to:
  establish a workload protection solution onto a network comprising a plurality of network devices;
  deploy a plurality of agents onto one or more network devices;
  receive telemetry data;
  evaluate a subnet boundary associated with the telemetry data;
  define one or more labels based on the subnet boundary;
  assign the one or more labels to reflect any one of a functional, security, and communication characteristic corresponding to the subnet boundary; and
  generate at least one policy recommendation based on the received telemetry data.

2. The device of claim 1, wherein the received telemetry data comprises at least scope data.

3. The device of claim 2, wherein the scope data is defined based on one or more best practices.

4. The device of claim 2, wherein the scope data defines one or more scope memberships.

5. The device of claim 2, wherein the workload protection logic is further configured to apply an application dependency mapping to the network associated with the workload protection solution.

6. The device of claim 1, wherein the received telemetry data comprises at least label data.

7. The device of claim 6, wherein the label data comprises a list of labels.

8. The device of claim 7, wherein the workload protection logic is further configured evaluate the plurality of agents and wherein the received telemetry data comprises at least agent data.

9. The device of claim 1, wherein the received telemetry data comprises at least common services data.

10. The device of claim 9, wherein the workload protection logic is further configured to determine one or more known ports or protocols.

11. The device of claim 10, wherein the at least common services data is based on at least the determined one or more known ports or protocols.

12. The device of claim 1, wherein the plurality of agents are associated with a workload comprising a workload host name.

13. The device of claim 12, wherein the received telemetry data comprises at least one or more workload host names.

14. The device of claim 1, wherein the at least one generated policy recommendation is an application dependency mapping.

15. A device, comprising:
 a processor;
 at least one network interface controller configured to provide access to a network; and a memory communicatively coupled to the processor, wherein the memory comprises a workload protection logic that is configured to:
- establish a workload protection solution onto the network comprising a plurality of network devices;
- deploy a plurality of agents onto one or more network devices;
- gather telemetry data;
- define a plurality of workload configurations;
- generate at least one application dependency mapping;
- evaluate a subnet boundary associated with the telemetry data;
- define a label based on the subnet boundary;
- assign the label to reflect any one of a functional, security, and communication characteristic corresponding to the subnet boundary; and
- apply the at least one generated application dependency mapping to the network.

16. The device of claim 15, wherein the plurality of workload configurations include at least one or more scopes.

17. The device of claim 15, wherein the defined plurality of workload configurations include at least one or more labels.

18. The device of claim 15, wherein the defined plurality of workload configurations include at least one or more common services.

19. A method generating an application dependency mapping, comprising:
- establishing a workload protection solution onto a network comprising a plurality of network devices;
- deploying a plurality of agents onto one or more network devices;
- gathering telemetry data;
- defining a plurality of workload configurations;
- evaluating a subnet boundary associated with the telemetry data;
- defining one or more labels based the subnet boundary;
- assigning the one or more labels to reflect any one of a functional, security, and communication characteristic corresponding to the subnet boundary; and
- generating at least one application dependency mapping.

* * * * *